(No Model.)
H. W. BUTLER.
SEPARATOR FOR ELECTRIC BATTERIES.
No. 391,229. Patented Oct. 16, 1888.
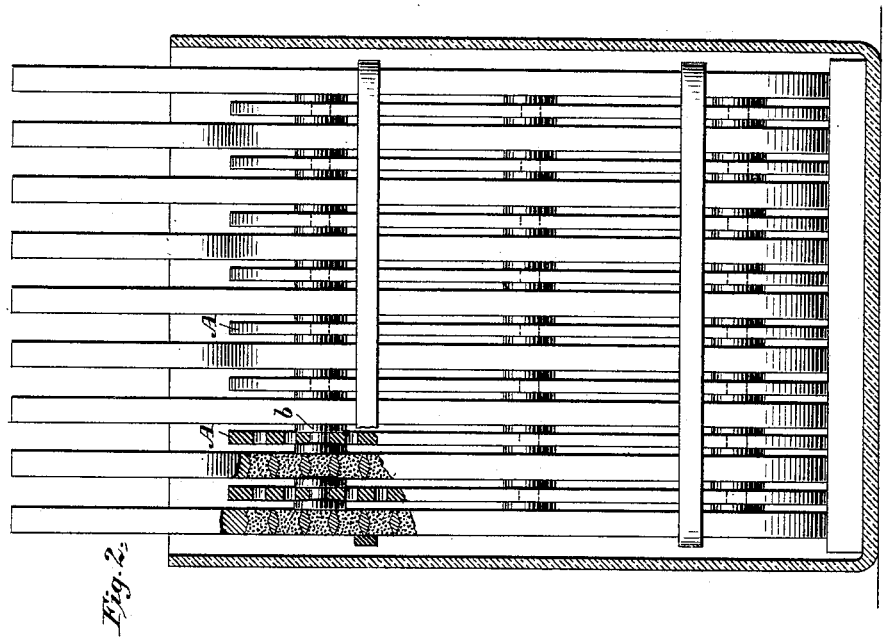
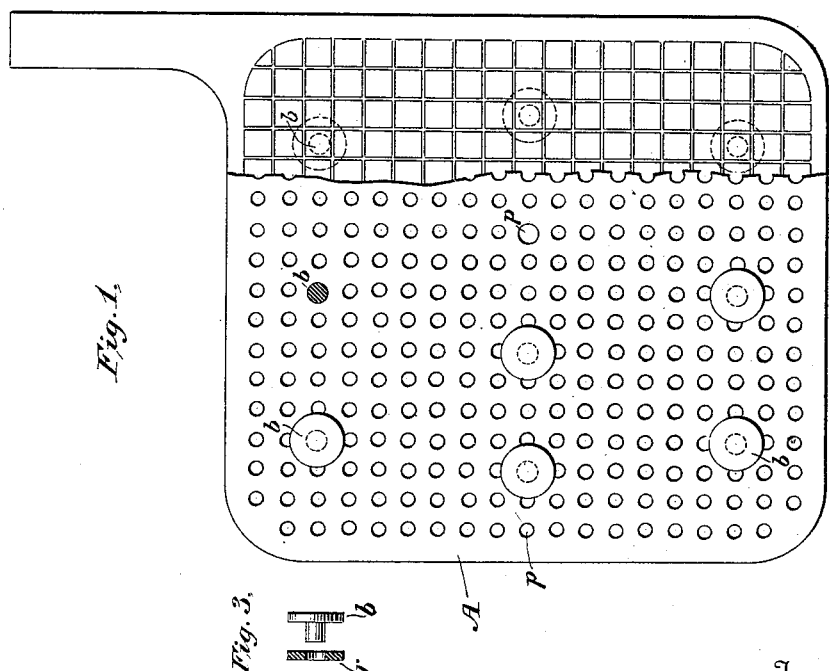
Witnesses.
Geo. W. Breck.
U. N. Shourds.
Inventor,
Herbert Wm Butler.
By his Attorney Wm B. Vansize

UNITED STATES PATENT OFFICE.

HERBERT W. BUTLER, OF BRIXTON, COUNTY OF SURREY, ENGLAND, ASSIGNOR, BY MESNE ASSIGNMENTS, TO THE ELECTRICAL ACCUMULATOR COMPANY, OF NEW YORK.

SEPARATOR FOR ELECTRIC BATTERIES.

SPECIFICATION forming part of Letters Patent No. 391,229, dated October 16, 1888.

Application filed February 15, 1888. Serial No. 264,116. (No model.) Patented in England March 30, 1887, No. 4,781.

*To all whom it may concern:*

Be it known that I, HERBERT WILLIAM BUTLER, a subject of the Queen of Great Britain and Ireland, and a resident of Brixton, in the county of Surrey, England, have invented certain new and useful Improvements in Separators for Electric Batteries, (for which I have obtained Letters Patent in Great Britain, No. 4,781, dated March 30, 1887,) of which the following is a specification.

My invention is an improvement in the construction of electric batteries, and is especially applicable to secondary batteries or accumulators.

The improvement consists in providing a separator of such material and form that the plates or elements of a battery are maintained at the proper distance from each other, while allowing for the proper circulation of the electrolytic fluid. For this purpose I place between two adjacent plates or elements a perforated plate or sheet of insulating material—such as cellulose or celluloid, vulcanite, porcelain, prepared card-board, or other suitable material—having formed on, secured to, or passed through it projections which extend outward from the side or sides of the separator. For instance, such a separator may be mounted in a frame or arranged in any way so that combined with the separator proper are projections forming distance-pieces between the plates and separators. The elements of the secondary battery in which these separators are designed for use consist of plates or supports having a series of perforations or receptacles in which is placed an active material. It sometimes happens that the active material in one of these perforations, owing to a heavy jolt or jar, will become dislodged. Such active material is a fragment which cannot possibly be larger than the perforation or receptacle in which it was originally placed; but it may become lodged between two plates, and thus short-circuit the battery. To guard against this the perforations in the separator are made smaller than the perforations or receptacles in the element of the battery, so that these fragments of active material cannot come into contact with two elements; but if they become lodged at all it will be between the perforated separator and an adjacent element, from which no harm can arise. The projections from the surface of the separator are intended to furnish a space between the separator and element, so that any fragments may fall to the bottom. These projections, however, must not be sharp or pointed, and they are preferably disk-shaped, and in diameter larger than the diameter of the perforations or receptacles in which the active material is placed. Otherwise the button of active material in a perforation would be liable to be split and displaced.

The accompanying drawings illustrate my invention.

Figure 1 shows a plan of the separator; Fig. 2, a cross-section of the separator in position in the cell. Fig. 3 is a detail view showing the rivet and nuts or buttons used for distance-pieces.

A is a sheet or plate—say one sixteenth inch thick—preferably of insulating material—such as celluloid—having numerous closely-arranged perforations, *p*. Buttons *r* are placed upon headed rivets *b*, preferably of the same material as the plate, to constitute the distance-pieces and provide a space between the battery-plate and the perforated separator. These perforations *p* must be smaller than the perforations in the elements of the battery. I prefer to make them about one-half the size. The buttons *b* or equivalent projections must be larger than the perforations in the element, so as to avoid splitting or deforming the active material. The plates or sheets composing the separator should be of about the same superficial area as the plate or element of the battery, and should conform to such elements in shape.

By the use of separators constructed as above described, should there occur any scaling of the plates, such as is due to imperfect construction or to misuse of the battery, the scales could not come in contact with two adjacent plates or elements of active material.

What I claim, and desire to secure by Letters Patent, is—

1. In an electric battery, the combination of two or more elements, each consisting of a plate or support containing perforations or receptacles, active material in said perforations or receptacles, a plate of insulating material having a series of perforations, each of which is smaller in diameter than the perforations or receptacles in the said element, and a series of projections upon the surface of the insulated plate, the contact-surfaces of which are greater than the diameter of the perforations or receptacles in the adjacent element.

2. The combination, in a battery, of an element consisting of a plate or support containing perforations or receptacles, active material in said perforations or receptacles, a complementary element, and a separator for said elements, consisting of a plate of insulating material having one or more projections the contact-surfaces of which are greater than the diameter of the perforations or receptacles in the said element.

Signed at London, in the county of Middlesex, this 2d day of February, A. D. 1888.

HERBERT W. BUTLER.

Witnesses:
 W. I. WEEKS,
 C. F. WATERMAN,
   *Both of 9 Birchin Lane, London.*